Patented Nov. 2, 1943

2,333,216

UNITED STATES PATENT OFFICE 2,333,216

PREPARATION OF ALDEHYDES

Hans-Georg Trieschmann, Erich Jutz, and Franz Reicheneder, Ludwigshafen - on - the - Rhine, Germany; vested in the Alien Property Custodian No Drawing. Application September 26, 1940, Serial No. 358,424. In Germany October 2, 1939

10 Claims. (Cl. 260—601)

The present invention relates to the preparation of aldehydes.

The catalytic hydrogenation of alcohols of the acetylene series, e. g. of propargyl alcohol and its higher homologues or butine-2-diol-1.4 and its higher homologues, ordinarily leads to the formation of the corresponding alcohols of the paraffin and olefine series. Thus, for example, if butine-2-diol-1.4 is led with hydrogen at high pressure over a highly active hydrogenation catalyst, butanediol-1.4 or butanol is formed. When carrying out this reaction in the presence of a catalyst of low activity or under conditions which serve to reduce the activity of the catalyst, butene-2-diol-1.4 is the main reaction product.

We have found that aliphatic aldehydes may be prepared in good yields from alcohols of the acetylene series (alkinols) which correspond to the general formula

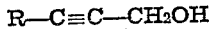

wherein R represents a hydrocarbon radical, e. g. methyl or a higher alkyl radical, or the radical of a hydroxy-substituted hydrocarbon, as for example the radicals —$CH_2OH$ or —$CH_2CH_2$—OH. Our method consists in treating these alcohols with hydrogen in the presence of a hydrogenation catalyst under acid conditions.

In one method of carrying out our invention, the alkinol is passed together with hydrogen over a hydrogenation catalyst precipitated on an acid carrier, e. g. silicic acid gel. This method is most suitably carried out in the vapor phase. Especially high yields of aldehydes are obtained when using hydrogenation catalysts of low activity which promote only the addition of one molecular proportion of hydrogen to one molecular proportion of the alkinol. Such catalysts include finely divided metallic palladium, in particular palladium prepared by the reduction of palladium chloride or nitrate, or finely divided iron, as for example Raney-iron, nickel catalysts the activity of which has been reduced by poisoning, or mixtures of these catalysts, e. g. mixtures of palladium and iron.

Instead of using catalysts applied to acid carriers, there may be used catalysts which contain small amounts of acids originating from the catalyst preparation or to which small amounts of free acid have been added. In this case, there may be used other carriers, e. g. pumice stone or kieselguhr.

There is also the process of carrying out our invention in the liquid phase by allowing hydrogen to act on a mixture of liquid alkinol and a hydrogenation catalyst. In the liquid phase process the catalysts described above may also be utilized. It is also possible to use catalyst compositions of non-acid character, provided that the reaction liquid has been acidified. Preferably the pH-value of the solution is within the range of between 2 and 6.

In general, the optimum temperature lies between 50 and 200° C. From 50 to 1000 grams of the vaporized alkinol may be passed per hour through 1 liter of the catalyst chamber. There may be used inert diluent gases or vapors or, when working in the liquid phase, inert diluent liquids wherein the alkinols are soluble. We prefer to carry out the reaction at normal pressure, though super-atmospheric pressure, e. g. pressures up to 10 or 30 atmospheres, may be used.

The following examples illustrate several ways in which the principle of our invention may be applied, but are not to be construed as limiting the invention.

Example 1

Palladium deposited on an acid carrier is used as the catalyst. It is prepared in the following manner: 5 grams of palladium chloride are dissolved in 200 grams of water, and the solution is thoroughly mixed with kieselguhr, containing about 3 per cent of iron and 1.7 per cent of $SO_4$. The mixture is dried, and the powder obtained pressed into pills. The pills are reduced in a current of hydrogen at 200° C.

50 grams of a mixture consisting of 35 grams of propargyl alcohol and 15 grams of water per hour are vaporized at 150° C. The vapors are admixed with 40 liters of hydrogen and led over 100 cubic centimeters of the catalyst at 105° C. The vapors emerging from the catalyst are condensed. The aldehyde formed is separated from water and small amounts of allyl alcohol and propargyl alcohol by fractional distillation. 295 grams of propion aldehyde are thus obtained from 500 grams of the propargyl alcohol-water mixture. The yield exceeds 80 per cent of the theoretical yield.

Example 2

A 35 per cent aqueous solution of butine-2-diol-1.4 is heated to 95° C. in a vessel charged with pumice stone. 60 grams of the preheated mixture are led per hour together with 30 liters of hydrogen over 100 cubic centimeters of the catalyst described in Example 1 at from 100 to 110° C. From 1000 grams of the butinediol solution there are obtained 250 grams of gamma-hydroxy butyraldehyde.

What we claim is:

1. A process for the production of aldehydes which consists in treating alcohols of the acetylene series corresponding to the general formula $$R—C≡C—CH_2OH$$

wherein R stands for a member of the group consisting of hydrogen, straight chain aliphatic hydrocarbon radicals and hydroxy-substituted straight chain aliphatic hydrocarbon radicals with hydrogen in the presence of a hydrogenation catalyst under acid conditions and at a temperature below the decomposition point of said alcohols.

2. A process for the production of aldehydes which consists in treating alcohols of the acetylene series corresponding to the general formula $$R—C≡C—CH_2OH$$

wherein R stands for a member of the group consisting of hydrogen, straight chain aliphatic hydrocarbon radicals and hydroxy-substituted straight chain aliphatic hydrocarbon radicals with hydrogen in the presence of a hydrogenation catalyst applied on a silicic acid gel and at a temperature below the decomposition point of said alcohols.

3. A process for the production of aldehydes which consists in treating alcohols of the acetylene series corresponding to the general formula $$R—C≡C—CH_2OH$$

wherein R stands for a member of the group consisting of hydrogen, straight chain aliphatic hydrocarbon radicals and hydroxy-substituted straight chain aliphatic hydrocarbon radicals with hydrogen under a pressure from normal to 30 atmospheres in the presence of a hydrogenation catalyst applied on a silicic acid gel and at a temperature below the decomposition point of said alcohols.

4. A process for the production of aldehydes which consists in treating alcohols of the acetylene series corresponding to the general formula $$R—C≡C—CH_2OH$$

wherein R stands for a member of the group consisting of hydrogen, straight chain aliphatic hydrocarbon radicals and hydroxy-substituted straight- chain aliphatic hydrocarbon radicals with hydrogen under a pressure from normal to 30 atmospheres in the presence of palladium deposited and a silicic acid gel at a temperature below the decomposition point of said alcohol.

5. A process for the production of propionaldehyde which consists in treating propargyl alcohol with hydrogen under a pressure from normal to 30 atmospheres in the presence of palladium deposited on a silicic acid gel at a temperature below the decomposition point of said alcohol.

6. The process as defined in claim 1 wherein the temperature ranges from about 50 to about 200° C.

7. The process as defined in claim 2, wherein the temperature ranges from about 50 to about 200° C.

8. The process as defined in claim 5, wherein the temperature is about 150° C.

9. A process for the production of gamma-hydroxy butyraldehyde which consists in treating butine-2-diol-1.4 with hydrogen under a pressure of from normal to 30 atmospheres in the presence of palladium deposited on kieselguhr at a temperature below the decomposition point of said alcohol.

10. The process as defined in claim 9 wherein the temperature ranges from 100 to 110° C.

HANS-GEORG TRIESCHMANN.
ERICH JUTZ.
FRANZ REICHENEDER.